United States Patent
Kobuse

(10) Patent No.: US 10,187,559 B2
(45) Date of Patent: Jan. 22, 2019

(54) FLASH BAND DETERMINATION DEVICE FOR DETECTING FLASH BAND, METHOD OF CONTROLLING THE SAME, STORAGE MEDIUM, AND IMAGE PICKUP APPARATUS

(71) Applicant: CANON KABUSHIKI KAISHA, Tokyo (JP)

(72) Inventor: Takenori Kobuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/457,535

(22) Filed: Mar. 13, 2017

(65) Prior Publication Data

US 2017/0272630 A1    Sep. 21, 2017

(30) Foreign Application Priority Data

Mar. 16, 2016 (JP) .................. 2016-052245

(51) Int. Cl.
*H04N 9/73* (2006.01)
*H04N 5/235* (2006.01)
*H04N 5/225* (2006.01)

(52) U.S. Cl.
CPC ......... *H04N 5/2256* (2013.01); *H04N 5/2354* (2013.01)

(58) Field of Classification Search
CPC ............. H04N 5/3572; H04N 5/2256; H04N 5/23248; H04N 5/235; H04N 5/3532; G06T 7/90; G06T 1/0007

USPC ................. 348/221.1, 226.1, 224.1
See application file for complete search history.

(56) References Cited

U.S. PATENT DOCUMENTS

| | | | |
|---|---|---|---|
| 2008/0165258 A1* | 7/2008 | Wajs | H04N 3/1562 348/222.1 |
| 2009/0052774 A1* | 2/2009 | Yoshii | G06T 5/009 382/167 |
| 2010/0013953 A1* | 1/2010 | Niikura | H04N 5/2353 348/226.1 |
| 2011/0012899 A1* | 1/2011 | Inoue | G06T 5/009 345/419 |
| 2012/0188403 A1* | 7/2012 | Gomita | H04N 5/2351 348/226.1 |
| 2016/0178433 A1* | 6/2016 | Aphek | G01J 1/4228 250/338.1 |

FOREIGN PATENT DOCUMENTS

JP    2009-253367 A    10/2009

\* cited by examiner

*Primary Examiner* — Xi Wang
(74) *Attorney, Agent, or Firm* — Cowan, Liebowitz & Latman, P.C.

(57) ABSTRACT

A flash band determination device that is capable of always detecting a flash band with high accuracy. It is determined whether or not there is a flash band caused by an external flash of light, which is an area having a luminance level higher than a threshold level, in a plurality of images which are continuously obtained. The threshold level is changed with respect to an image picked up with an exposure condition which is different from an exposure condition used in picking up a preceding image.

8 Claims, 9 Drawing Sheets

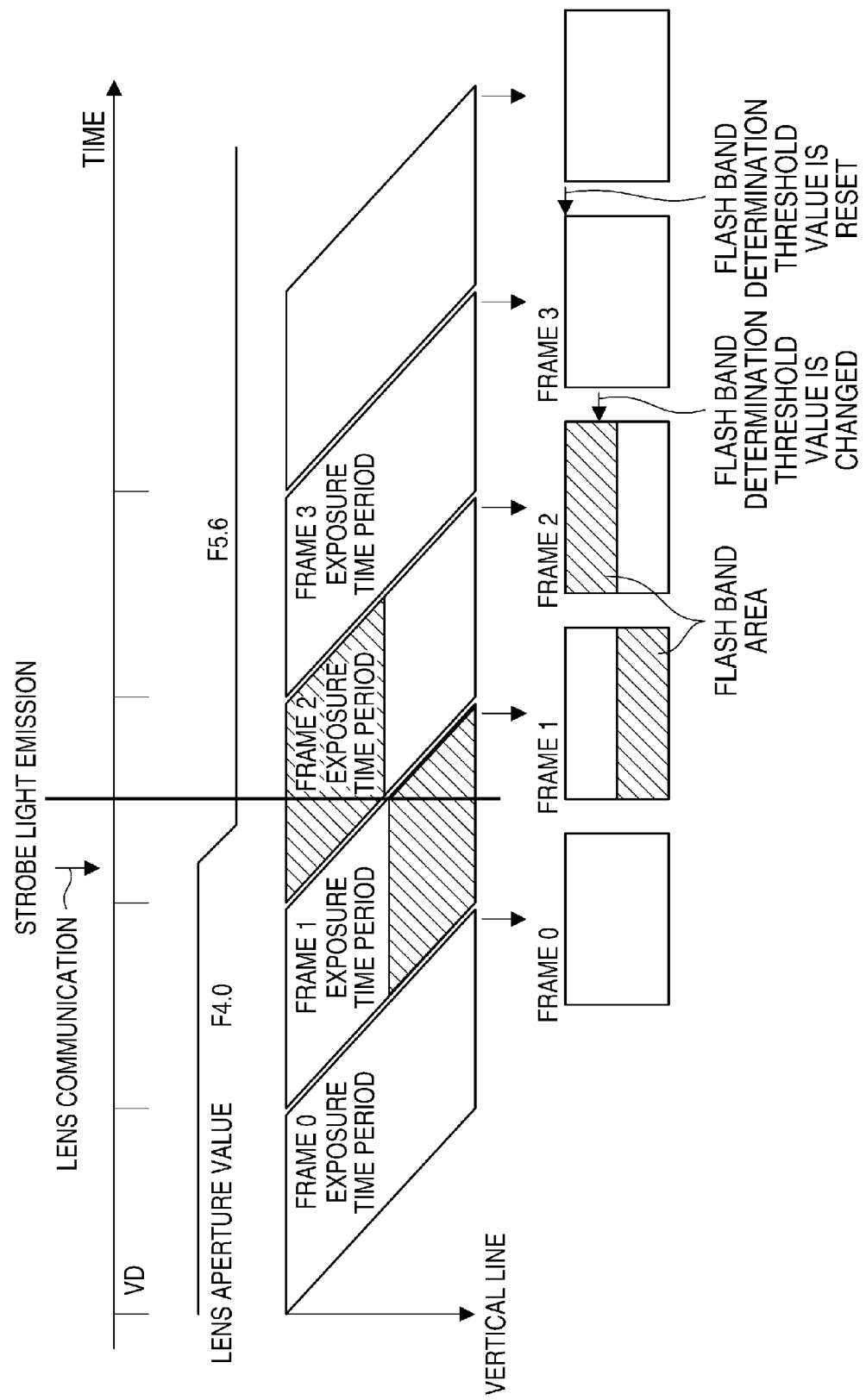

FLASH BAND DETERMINATION DEVICE FOR DETECTING FLASH BAND, METHOD OF CONTROLLING THE SAME, STORAGE MEDIUM, AND IMAGE PICKUP APPARATUS

BACKGROUND OF THE INVENTION

Field of the Invention

The present invention relates to a flash band determination device, a method of controlling the same, a storage medium, and an image pickup apparatus, and more particularly to a flash band determination device for detecting a flash band, that determines whether or not there is a flash band caused by an external flash of light in an image obtained through image pickup.

Description of the Related Art

In recent years, as an image pickup device used in an image pickup apparatus, such as a video camera, a CMOS image sensor (hereinafter referred to as the CMOS sensor) is used. In general, compared with a CCD image sensor (hereinafter referred to as the CCD sensor), the CMOS sensor is advantageous not only in that it is easy to manufacture, but also in that it consumes less power. Further, there is also proposed a CMOS sensor increased in frame speed of reading one frame by increasing the number of read-out channels.

The CMOS sensor uses a so-called rolling shutter method in which horizontal lines are sequentially exposed, and video signals (image signals) are sequentially read out on a line-by-line basis to thereby generate one frame. In the CMOS sensor using the rolling shutter method, the exposure timing for each line and the read-out time for each line are out of synchronization.

For this reason, if there is an external flash of light emitted in a very short emission time period, such as a flash or a strobe light, there is generated, depending on a location on the screen, an image in which one frame is divided into an upper belt-like area and a lower belt-like area different in brightness, over two frames. Such a step of brightness between the belt-like areas caused by the external flash of light is referred to as the flash band.

On the other hand, in a case where the CCD sensor is used, the above-mentioned flash band is not generated, so that even when an external flash of light is used, it is possible to obtain an image which is uniformly bright throughout one frame and is free from a sense of strangeness. For such a reason as described above, an image pickup apparatus using the CMOS sensor is equipped with a correction function for correcting a flash band.

For example, there has been proposed an image pickup apparatus configured to detect a flash band so as to correct the same (see e.g. Japanese Laid-Open Patent Publication (Kokai) No. 2009-253367). This image pickup apparatus detects whether or not there is a high-luminance time period corresponding to one frame, and if the detected high-luminance time period corresponds to one frame, it is determined that a flash band has occurred.

Incidentally, to detect a flash band caused in each frame over two frames by an external flash of light, it is required to detect a change in line average luminance in a horizontal direction in an image, and determine whether or not the change in luminance continues over two frames. However, if the light amount of the external flash of light is not large enough, when there is a change in the aperture of a lens, a gain of the image pickup device, or the like, the level of the flash band is changed between the two frames. As a result, the level of the flash band is sometimes lower than a threshold level for determining a high luminance, which reduces the accuracy of flash band detection.

SUMMARY OF THE INVENTION

The present invention provides a flash band determination device that is capable of always detecting a flash band with high accuracy, a method of controlling the same, a storage medium, and an image pickup apparatus.

In a first aspect of the invention, there is provided a flash band determination device that determines whether or not there is a flash band caused by an external flash of light in an image obtained through image pickup, comprising a determination unit configured to determine whether or not there is a flash band which is an area having a luminance level higher than a threshold level in a plurality of images which are continuously obtained, and a changing unit configured to change the threshold level with respect to an image picked up with an exposure condition which is different from an exposure condition used in picking up a preceding image.

In a second aspect of the invention, there is provided an image pickup apparatus including an image pickup unit configured to sequentially read and output images corresponding to optical images each formed via an image pickup optical system, and a flash band determination device that determines whether or not there is a flash band caused by an external flash of light in the images, wherein the flash band determination device comprises a determination unit configured to determine whether or not there is a flash band which is an area having a luminance level higher than a threshold level in a plurality of images which are continuously obtained, and a changing unit configured to change the threshold level with respect to an image picked up with an exposure condition which is different from an exposure condition used in picking up a preceding image.

In a third aspect of the invention, there is provided a method of controlling a flash band determination device that determines whether or not there is a flash band caused by an external flash of light in an image obtained through image pickup, comprising determining whether or not there is a flash band which is an area having a luminance level higher than a threshold level in a plurality of images which are continuously obtained, and changing the threshold level with respect to an image picked up with an exposure condition which is different from an exposure condition used in picking up a preceding image.

In a fourth aspect of the invention, there is provided a non-transitory computer-readable storage medium storing a computer-executable program for executing a method of controlling a flash band determination device that determines whether or not there is a flash band caused by an external flash of light in an image obtained through image pickup, wherein the method comprises determining whether or not there is a flash band which is an area having a luminance level higher than a threshold level in a plurality of images which are continuously obtained, and changing the threshold level with respect to an image picked up with an exposure condition which is different from an exposure condition used in picking up a preceding image.

According to the present invention, when the exposure condition is changed, the threshold level is changed accordingly, and hence it is possible to always detect a flash band with high accuracy.

Further features of the present invention will become apparent from the following description of exemplary embodiments (with reference to the attached drawings).

BRIEF DESCRIPTION OF THE DRAWINGS

FIG. 5 is a diagram useful in explaining a relationship between exposure on the image pickup device appearing in FIG. 1 and output images, and a change of a flash band determination threshold value.

DESCRIPTION OF THE EMBODIMENTS

The present invention will now be described in detail below with reference to the accompanying drawings showing embodiments thereof.

Figure 1:
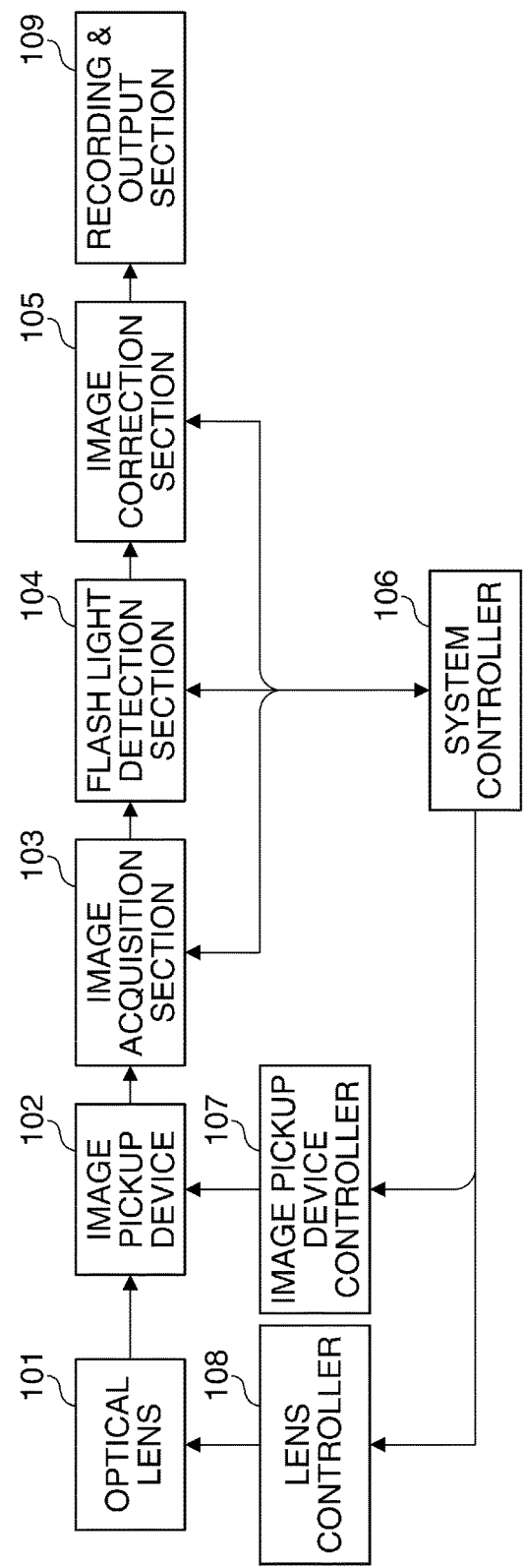
FIG. 1 is a block diagram of a digital camera as an image pickup apparatus including a flash band determination device according to a first embodiment of the present invention.

FIG. 1 is a block diagram of an image pickup apparatus including a flash band determination device according to a first embodiment of the present invention.

The illustrated image pickup apparatus is e.g. a digital camera (hereinafter simply referred to as the "camera") 1 that is capable of shooting a moving image, and has an optical lens unit (hereinafter simply referred to as the "optical lens") 101. The optical lens (image pickup optical system) 101 includes a lens group, and has a focusing mechanism, a diaphragm mechanism, and a zooming mechanism. The focusing mechanism is used to adjust the focus, and the diaphragm mechanism is used to adjust the amount of light and the depth of field. Further, the zooming mechanism is used to change the focal length.

An object image (optical image) is formed on an image pickup device 102 via the optical lens 101. The image pickup device 102 outputs electrical signals (analog signals) corresponding to the optical image. Examples of the image pickup device 102 include a CCD image sensor (Charge Coupled Device) and a CMOS image sensor. In the illustrated example, the CMOS image sensor that sequentially performs read-out of pixels on a line-by-line basis is used as the image pickup device 102.

An image acquisition section 103 acquires image signals output from the image pickup device 102 as digital signals. In other words, the image acquisition section 103 includes an analog-digital front end that converts analog signals output from the image pickup device 102 to digital signals (image signals).

A flash light detection section 104 receives an output from the image acquisition section 103, and detects whether or not an external flash of light emitted e.g. from a flash or a strobe appears in an image obtained through image pickup as a flash band (i.e. whether or not there is a flash band). When a flash band is detected by the flash light detection section 104, an image correction section 105 corrects the image including a flash band (flash band image) to a full-screen flash image, as described hereinafter.

A system controller 106 controls the overall operation of the camera 1. In this control, the system controller 106 controls the camera 1 by determining how to operate the camera 1 according to a user's operation. An image pickup device controller 107 controls driving of the image pickup device 102 under the control of the system controller 106. For example, the image pickup device controller 107 performs the control including determination of a gain of the image pickup device 102 and delivery of a vertical synchronization signal VD to the image pickup device 102.

A lens controller 108 controls an aperture, focusing, zoom, ND (Neutral Density), and so forth of the optical lens 101 under the control of the system controller 106. A recording and output section 109 records corrected image signals output from the image correction section 105 in a storage medium (not shown), and outputs the corrected image signals to a display device (not shown), such as an LCD.

Here, a description will be given of a case where brightness of the optical lens or the gain of the image pickup device 102 is changed in a frame following a frame in which a flash band has occurred when using the CMOS sensor as the image pickup device. That is, a case where the level of an image signal input to the image acquisition section 103 is changed will be described.

Figure 2:
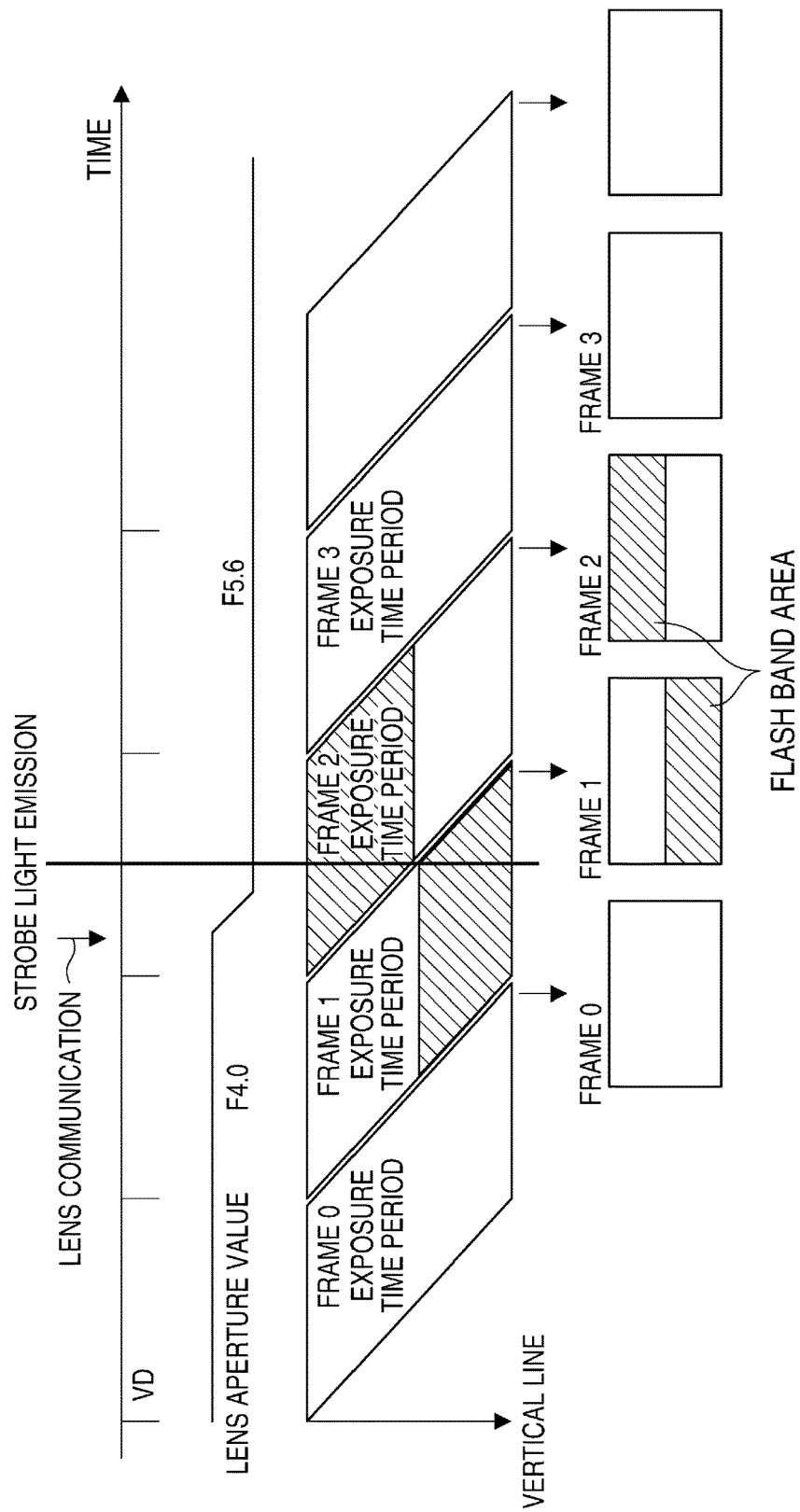
FIG. 2 is a diagram useful in explaining a relationship between exposure of an image pickup device appearing in FIG. 1 and output images.

FIG. 2 is a diagram useful in explaining a relationship between exposure of the image pickup device appearing in FIG. 1 and output images.

Referring to FIG. 2, the horizontal axis represents a time (sec), and the vertical axis represents a vertical line. Further, FIG. 2 shows a relationship between the timing of generation of an external flash of light (strobe light emission) and output images. Further, VD represents a vertical synchronization signal input to the image pickup device 102.

The image pickup device controller 107 performs read-out control of the image pickup device 102 using a so-called rolling shutter method of sequentially exposing the horizontal lines, and sequentially reading out image signals on a horizontal line-by-horizontal line basis to generate one frame. Let it be assumed that in doing this, strobe light emission is performed in a time period shorter than one line time between frame 1 (first frame) and frame 2 (second frame). That is, let it be assumed that strobe light emission is performed in a state in which exposure for the frame 1 is being performed on the lower part of the screen, and exposure for the next frame 2 is being performed on the upper part of the screen.

As a result, a flash band (area in which the luminance level is higher than a predetermined threshold level) is generated in an area of the frame 1 from the intermediate portion to the lower end, and further, a flash band is generated in an area of the frame 2 from the upper end to a horizontal line substantially the same as the horizontal line corresponding to the start of the flash band in the frame 1.

Figure 3A:
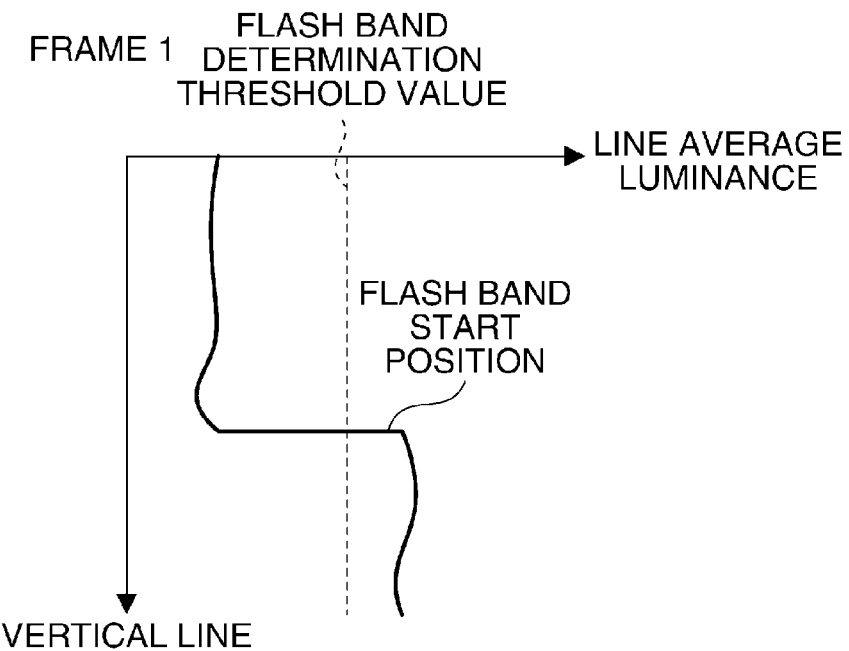
FIGS. 3A and 3B are diagrams useful in explaining an example of a relationship between a line average luminance in a horizontal direction and a vertical line in a frame, showing first and second frames, respectively.
Figure 3B:
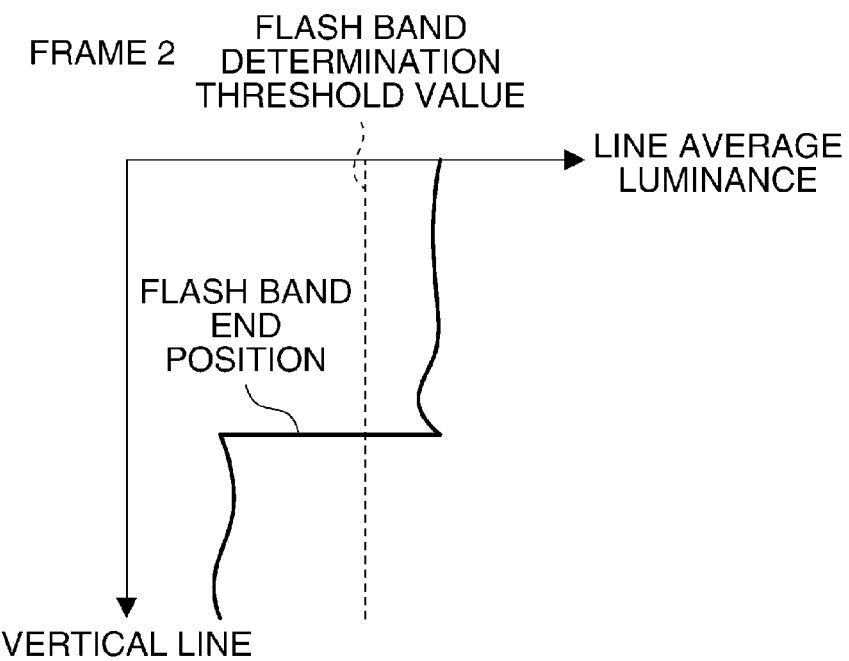

FIGS. 3A and 3B are diagrams useful in explaining an example of a relationship between a line average luminance in a horizontal direction and the vertical line in a frame, showing the first and second frames, respectively.

Referring to FIGS. 3A and 3B, the horizontal axis represents, a line average luminance (or an integrated value of respective luminance values of pixels in a line) in the horizontal direction of an image (frame), and the vertical axis represents a vertical line indicating positions in the vertical direction of respective horizontal lines arranged in the vertical direction. Now, let it be assumed that the exposure condition of the optical lens 101 and the image pickup device 102 are not changed when the frames 1 and 2 are photographed (i.e. when a plurality of images are continuously photographed). In this case, the system controller 106 determines a position where the line average luminance exceeds a predetermined flash band determination threshold value (threshold level) in the frame 1 as a flash band start position. Then, the system controller 106 determines the same position in the next frame 2 as that of the flash band start position in the frame 1, i.e. a position in the frame 2 where the line average luminance crosses the flash band determination threshold value as a flash band end position.

On the other hand, as shown in FIG. 2, for example, when the aperture of the optical lens 101 is changed (changed from F4.0 to F5.6) between the frame 1 and the frame 2 by lens communication, the line average luminance is changed between the frame 1 and the frame 2.

Figure 4A:
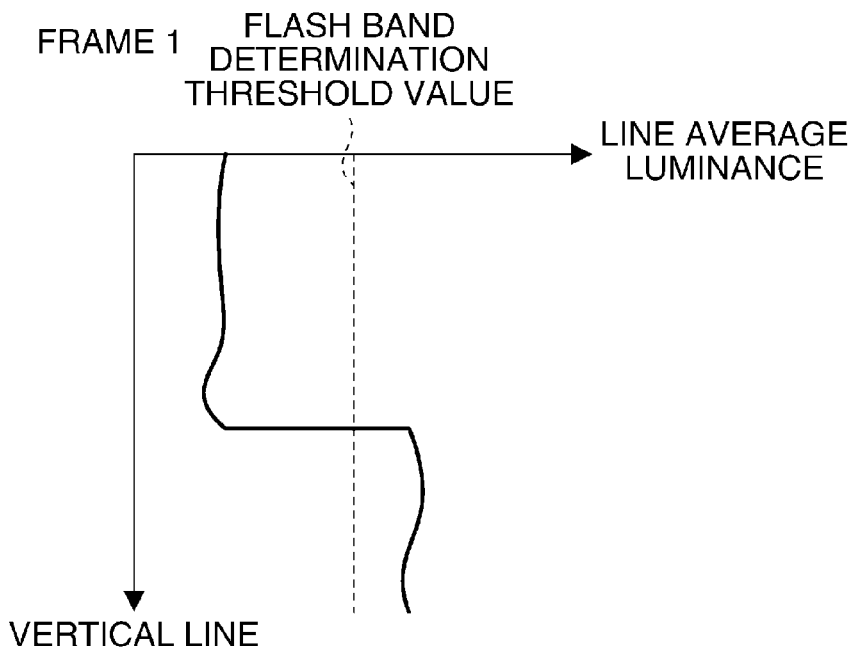
FIGS. 4A and 4B are diagrams useful in explaining another example of the relationship between the line average luminance in the horizontal direction and the vertical line in a frame, showing the first and second frames, respectively.
Figure 4B:
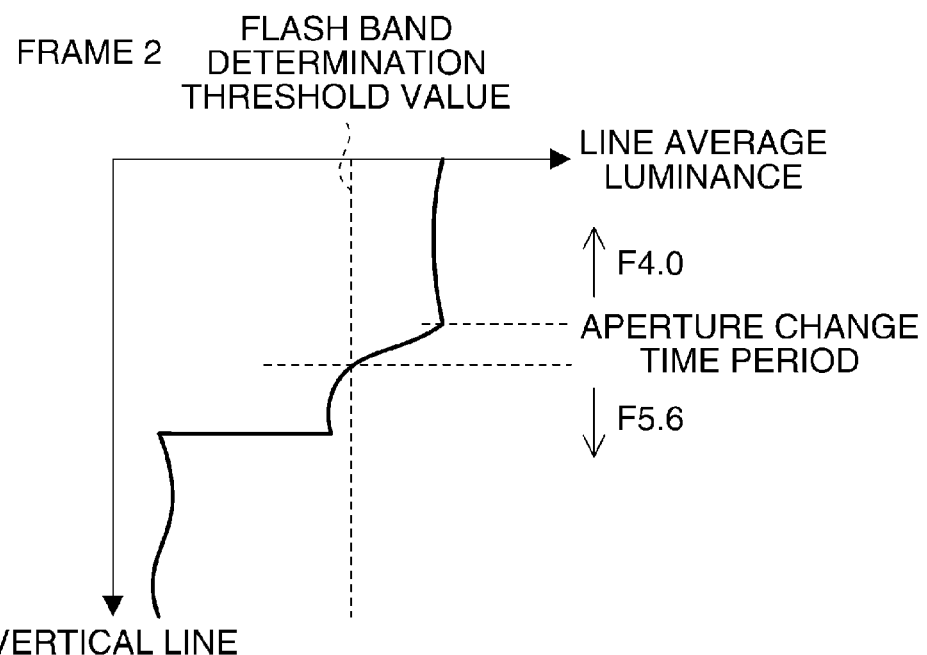

FIGS. 4A and 4B are diagrams useful in explaining another example of the relationship between the line average luminance in the horizontal direction and the vertical line in a frame, showing the first and second frames, respectively.

FIGS. 4A, and 4B each show changes in line average luminance generated when the aperture as one of the exposure conditions is changed during a time period in which a flash band occurs. For example, let it be assumed that the aperture is changed from F4.0 to F5.6 in the frame 2. When the aperture is changed from F4.0 to F5.6, at this time point, the line average luminance is reduced to ½ of the line average luminance before the aperture is changed. In a case where the line average luminance is thus reduced, the line average luminance sometimes crosses the flash band determination threshold value in the frame 2. This causes the system controller 106 to determine the position where the line average luminance crosses the flash band determination threshold value as the flash band end position.

If such an event occurs, the number of lines from the flash band start position in the frame 1 to the flash band end position in the frame 2 does not reach the number of lines corresponding to one frame. As a consequence, the system controller 106 does not determine that a flash band has occurred.

To prevent this erroneous determination, in the camera 1 shown in FIG. 1, when an operation for changing the aperture of the optical lens 101 is performed, the flash band determination threshold value is changed with respect to an area from a position where the aperture is changed to the lower end of the image, or with respect to the whole frame in which the aperture is changed.

FIG. 5 is a diagram useful in explaining a relationship between exposure on the image pickup device appearing in FIG. 1 and output images, and a change of the flash band determination threshold value.

When the system controller 106 changes the aperture of the optical 101 by lens communication, the system controller 106 changes the flash band determination threshold value. In the illustrated example, the system controller 106 performs lens communication to thereby change the aperture during the exposure period of the frame 2, and hence the brightness (line average luminance) is changed from an intermediate portion of the frame 2. When lens communication is performed, the system controller 106 recognizes a line where the aperture is changed based on the timing of the lens communication. Then, the system controller 106 changes the flash band determination threshold value from the line where the aperture is changed (i.e. from the line in the frame 2). After that, the system controller 106 resets the flash band determination threshold value to the original flash band determination threshold value in frame 3 (third frame).

Note that in a case where the timing of lens communication is irregular or the timing in which the diaphragm is actually operated after lens communication is unknown, the system controller 106 changes the flash band determination threshold value with respect to the whole frame in which the aperture is changed.

Figure 6A:
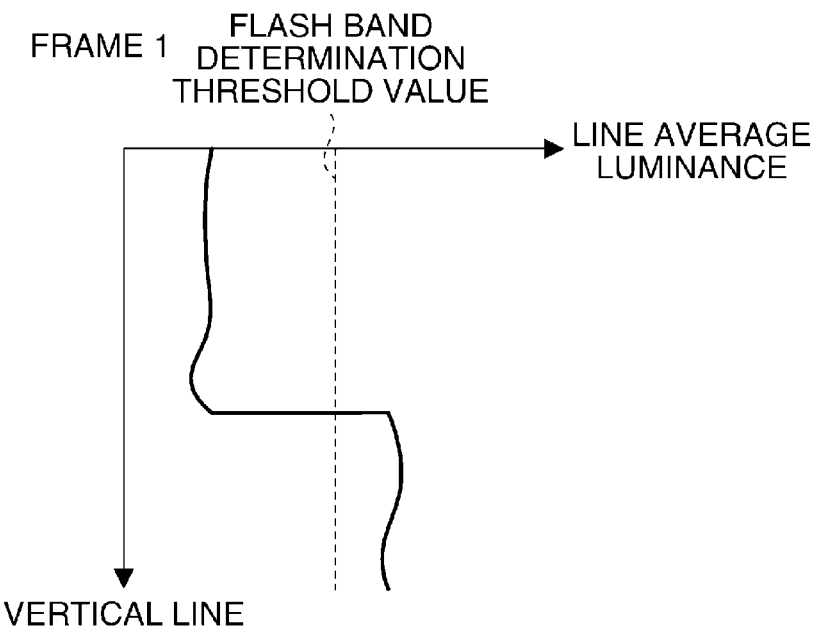
FIGS. 6A and 6B are diagrams useful in explaining detection of a flash band, which is performed in a case where the flash band determination threshold value is changed when an aperture of an optical lens appearing in FIG. 1 is changed, showing the first and second frames, respectively.
Figure 6B:
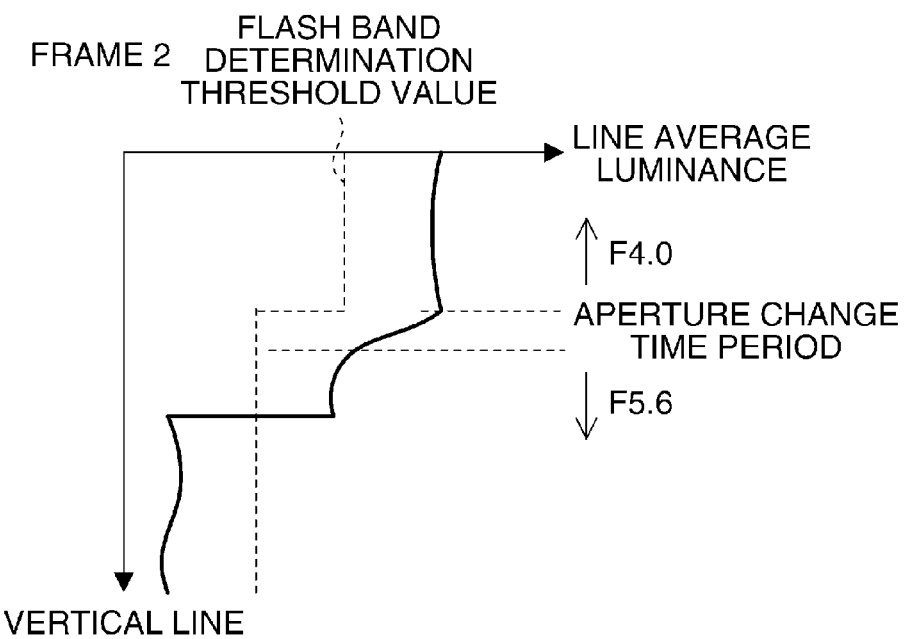

FIGS. 6A and 6B are diagrams useful in explaining detection of a flash band, which is performed in a case where the flash band determination threshold value is changed when the aperture of the optical lens appearing in FIG. 1 is changed, showing the first and second frames, respectively.

Now, let it be assumed that the aperture is changed from F4.0 to F5.6 in the frame 2. When the aperture is changed from F4.0 to F5.6, as mentioned above, at this time point, the line average luminance is reduced to ½ of the line average luminance before the aperture is changed. At this time, the system controller 106 sets the flash band determination threshold value to a lower value than the line average luminance immediately after the reduction.

As a result, the flash band end position in the frame 2 is at the same line as the flash band start position in the frame 1. Therefore, the number of lines from the flash band start position in the frame 1 to the flash band end position in the frame 2 becomes equal to the number of lines of one frame. This enables the system controller 106 to determine that a flash band has occurred.

Figure 7A:
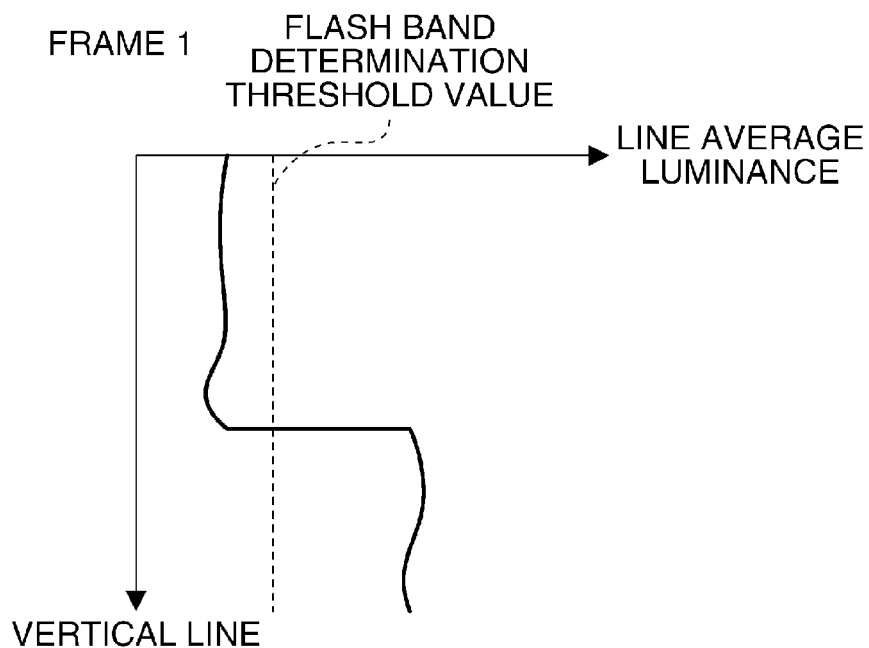
FIGS. 7A and 7B are diagrams useful in explaining detection of a flash band, which is performed in a case where the flash band determination threshold value is changed when a gain of the image pickup device appearing in FIG. 1 is changed, showing the first and second frames, respectively.
Figure 7B:
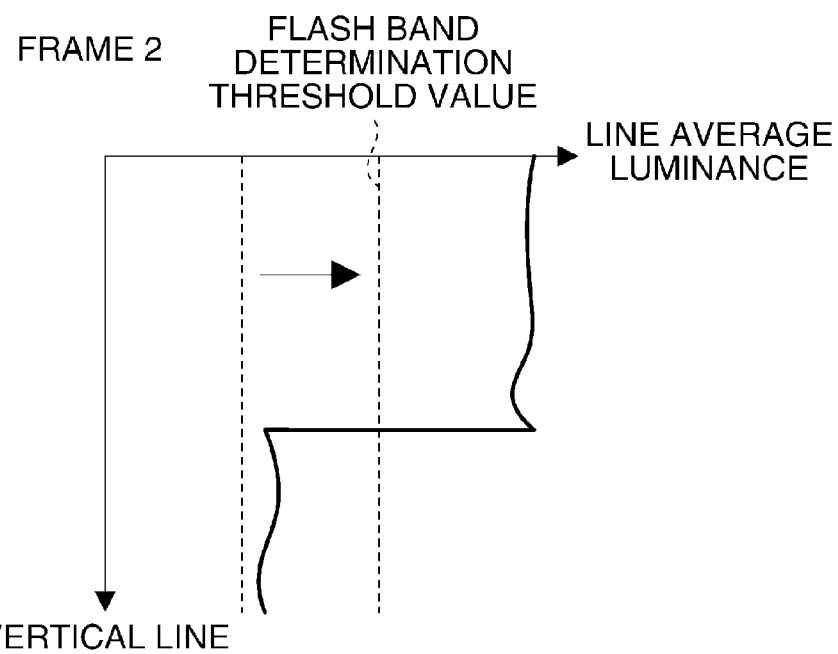

FIGS. 7A and 7B are diagrams useful in explaining detection of a flash band, which is performed in a case where the flash band determination threshold value is changed when the gain of the image pickup device appearing in FIG. 1 is changed, showing the first and second frames, respectively.

In general, the gain of the image pickup device 102 is changed on a frame-by-frame basis. Now, let it be assumed that the system controller 106 changes the gain of the image pickup device 102 to change the gain setting of the frame 2 during the exposure period of the frame 1. For example, it is assumed that the gain of the image pickup device 102 is increased in the frame 2, whereby the image is made brighter. In this case, the line average luminance is increased in the frame 2, which sometimes causes the same not to cross the flash band determination threshold value at the flash band end position.

Similarly, when the gain of the image pickup device 102 is reduced to make the image darker, this also sometimes causes the line average luminance not to cross the flash band determination threshold value at the flash band end position.

In the illustrated example in FIGS. 7A and 7B, the gain of the image pickup device 102 is increased in the frame 2, and in this case, the system controller 106 increases the flash band determination threshold value by a predetermined value at a time point when the gain of the image pickup device 102 is increased. This predetermined value is e.g. such a value that will cause the line average luminance to cross the flash band determination threshold value at the flash band end position.

Figure 8:
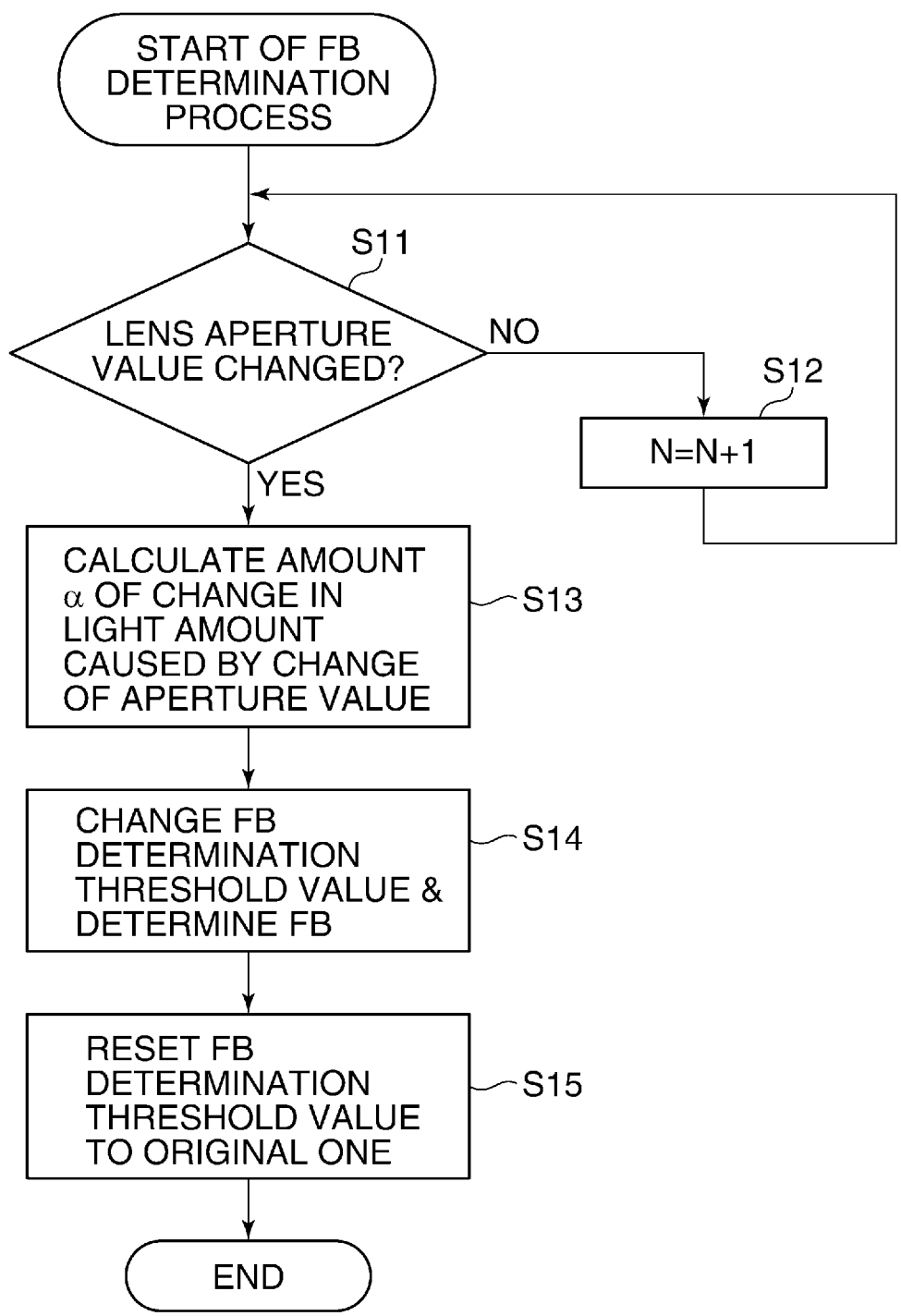
FIG. 8 is a flowchart of a flash band determination process performed by the camera shown in FIG. 1.

FIG. 8 is a flowchart of a flash band determination process performed by the camera 1, shown in FIG. 1.

When the flash band (FB) determination process is started, the system controller 106 determines whether or not the aperture value of the optical lens 101 as one of the exposure conditions has been changed during exposure performed with respect to a frame N (N is a natural number: indicating the current image) (step S11). If the aperture value has not been changed (NO to the step S11), the system controller 106 sets N=N+1 (step S12), and returns to the step S11. That is, the system controller 106 then executes the step S11 with respect to the next frame (N+1).

If the aperture value has been changed (YES to the step S11), the system controller 106 calculates an amount α of change in the light amount caused by the change of the aperture value (step S13). Then, the system controller 106 changes the flash band determination threshold value based on the changed amount α of change in the light amount (step S14). After that, in the step S14, the system controller determines whether or not a flash band has occurred, using the changed flash band determination threshold value. Then, the system controller 106 resets the flash band determination threshold value to the original flash band determination threshold value in the next frame (N+1) (step S15), followed by terminating the flash band determination process.

Although in FIG. 8, the aperture value is used as the exposure condition, an adjustment amount of the light amount of an ND filter, the gain of the image pickup device 102, a shutter speed, a digital gain used in A/D conversion, or the luminance level of an image input to the flash light detection section 104 may be used. Although in the above-described example, the flash band determination threshold value is changed, the line average luminance value may be corrected according to the exposure condition.

As described above, in the first embodiment of the present invention, even when the exposure condition is changed at the time of occurrence of a flash band, it is possible to properly detect the flash band.

Next, a description will be given of the camera 1 equipped with a flash band determination device according to a second embodiment of the present invention.

In the above-described first embodiment, when the exposure condition is changed, the flash band determination threshold value is changed in a frame in which the exposure condition is changed. In the second embodiment, in a state in which a flash band is not detected from the current frame, even when the exposure condition is changed in the next frame, the flash band determination threshold value is not changed.

Figure 9:
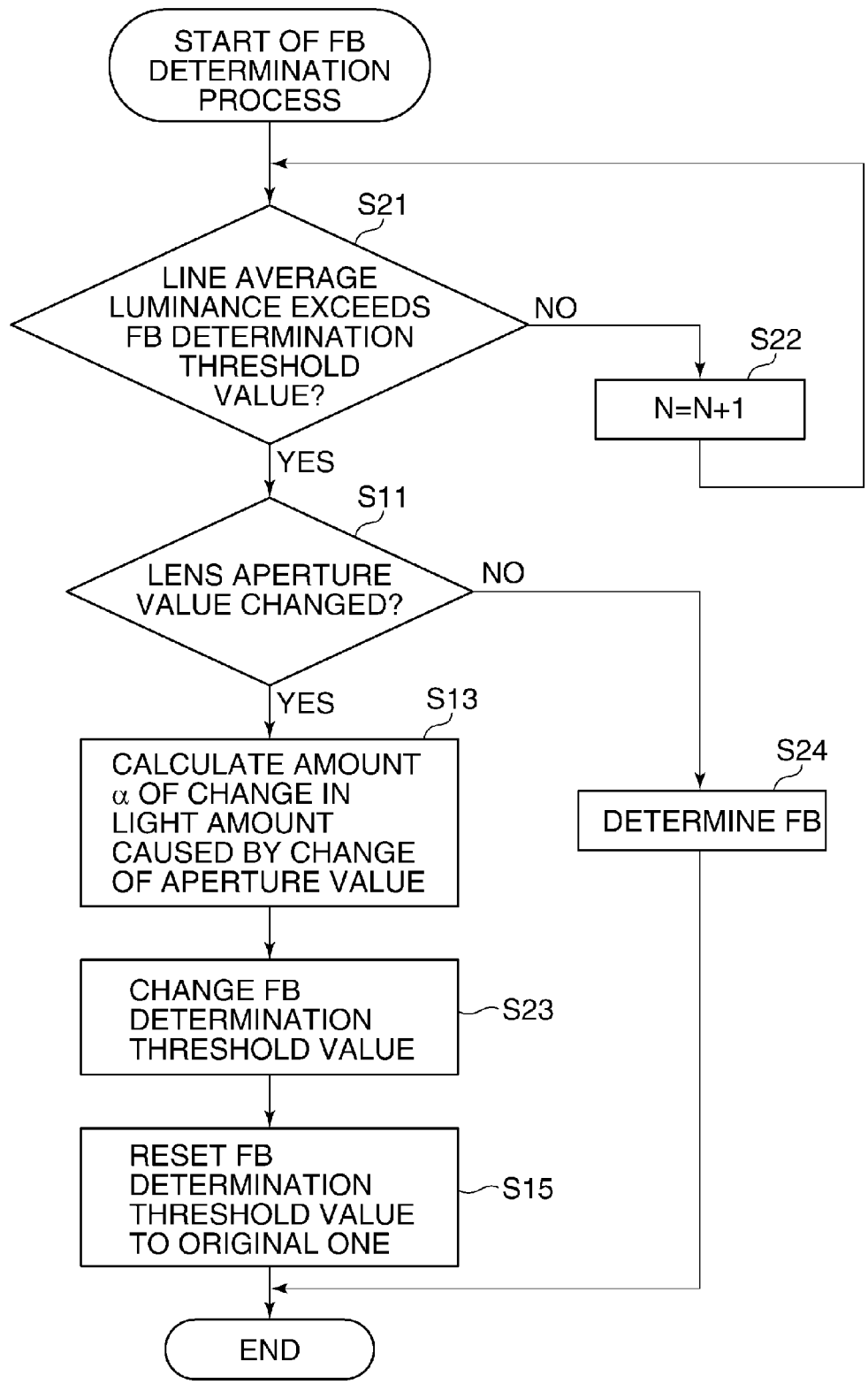
FIG. 9 is a flowchart of a flash band determination process performed by a digital camera as an image pickup apparatus according to a second embodiment of the present invention.

FIG. 9 is a flowchart of a flash band determination process performed by the camera 1 according to the second embodiment of the present invention. Note that in FIG. 9, the same steps as the steps in FIG. 8 are denoted by the same step numbers, and description thereof is omitted.

When the flash band determination process is started, the system controller 106 determines whether or not the line average luminance exceeds the flash band determination threshold value in the frame (current frame) N, i.e. whether or not a flash band has occurred (step S21). If a flash band has not occurred (NO to the step S21), the system controller 106 sets N=N+1 (step S22), and returns to the step S21.

On the other hand, if a flash band has occurred (YES to the step S21), the system controller 106 executes the step S11, described with reference to FIG. 8. If the aperture value has been changed (YES to the step S11), the system controller 106 executes the step S13, described with reference to FIG. 8. Then, the system controller 106 changes the flash band determination threshold value to be used in the next frame (N+1) (step S23).

After that, in a frame (N+2), the system controller 106 resets the changed flash band determination threshold value to the original flash band determination threshold value in the step S15. Then, the system controller 106 terminates the flash band determination process.

If the aperture value has not been changed (NO to the step S11), the system controller 106 determines occurrence of a flash band in the next frame (N+1) without changing the flash band determination threshold value (step S24). That is, the system controller 106 determines the flash band end position in the next frame (N+1).

As described above, in the second embodiment of the present invention, when a flash band has occurred in the current frame, the flash band determination threshold value is changed only in a case where the exposure condition is changed. This makes it possible to improve the accuracy of flash band detection with respect to a frame in which the exposure condition is changed.

As is clear from the above description, in the illustrated example in FIG. 1, the system controller 106 and the flash light detection section 104 function as a determination unit, and the system controller 106 functions as a changing unit. Further, the flash band determination device is formed at least by the system controller 106 and the flash light detection section 104.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method based on the functions of the above-described embodiments may be caused to be executed by the flash band determination device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-052245 filed Mar. 16, 2016, which is hereby incorporated by reference herein in its entirety.

What is claimed is:

1. A flash band determination device that determines whether or not there is a flash band caused by an external flash of light in an image obtained through image pickup by an image pickup device, comprising:
    at least one processor:
    a memory,
    wherein the at least one processor is configured to function as following units by processing data stored in the memory:
    a determination unit configured to determine whether or not there is a flash band which is an area having a luminance level higher than a threshold level in a plurality of images which are continuously obtained; and
    a changing unit configured to change the threshold level with respect to a current image picked up with an exposure condition which is different from an exposure condition used in picking up a preceding image;
    wherein when it is determined by said determination unit that the flash band is present in the preceding image, and also image pickup has been performed with respect to the current image with the exposure condition different from the exposure condition used in picking up the preceding image, said changing unit changes the threshold level.

2. The flash band determination device according to claim 1, wherein said determination unit determines whether or not an integrated value of respective luminance values of pixels obtained from the current image, on a line-by-line basis, exceeds the changed threshold level, and determines the flash band of the current image based on a result of the determination.

3. The flash band determination device according to claim 1, wherein an aperture value of an optical system of the image pickup is used as the exposure condition.

4. The flash band determination device according to claim 1, wherein a gain of the image pickup device that outputs an image corresponding to an optical image which is formed thereon via an optical system of the image pickup device is used as the exposure condition.

5. The flash band determination device according to claim 1, wherein said changing unit changes the threshold level based on a change in an amount of light caused by a change of the exposure condition.

6. An image pickup apparatus including:
    an image pickup unit configured to sequentially read and output images corresponding to optical images each formed via an image pickup optical system, and
    a flash band determination device that determines whether or not there is a flash band caused by an external flash of light in the images,
    wherein the flash band determination device comprises:
        at least one processor; and
        a memory,
        wherein the at least one processor is configured to function as following units by processing data stored in the memory:
        a determination unit configured to determine whether or not there is a flash band which is an area having a luminance level higher than a threshold level in a plurality of images which are continuously obtained; and
        a changing unit configured to change the threshold level with respect to a current image picked up with an exposure condition which is different from an exposure condition used in picking up a preceding image;
        wherein when said determination unit determines that the flash band is present in the preceding image, and also image pickup has been performed with respect to the current image with the exposure condition different from the exposure condition used in picking up the preceding image, said changing unit changes the threshold level.

7. A method of controlling a flash band determination device that determines whether or not there is a flash band caused by an external flash of light in an image obtained through image pickup, comprising:
    determining whether or not there is a flash band which is an area having a luminance level higher than a threshold level in a plurality of images which are continuously obtained; and changing the threshold level with respect to a current image picked up with an exposure condition which is different from an exposure condition used in picking up a preceding image; wherein when it is determined that the flash band is present in the preceding image, and also image pickup has been performed with respect to the current image with the exposure condition different from the exposure condition used in picking up the preceding image, changing the threshold level.

8. A non-transitory computer-readable storage medium storing a computer-executable program for executing a method of controlling a flash band determination device that determines whether or not there is a flash band caused by an external flash of light in an image obtained through image pickup,
    wherein the method comprises:
    determining whether or not there is a flash band which is an area having a luminance level higher than a threshold level in a plurality of images which are continuously obtained; and changing the threshold level with respect to a current image picked up with an exposure condition which is different from an exposure condition used in picking up a preceding image;
    wherein when it is determined that the flash band is present in the preceding image, and also image pickup has been performed with respect to the current image with the exposure condition different from the exposure condition used in picking up the preceding image, changing the threshold level.

* * * * *